Figure 1:
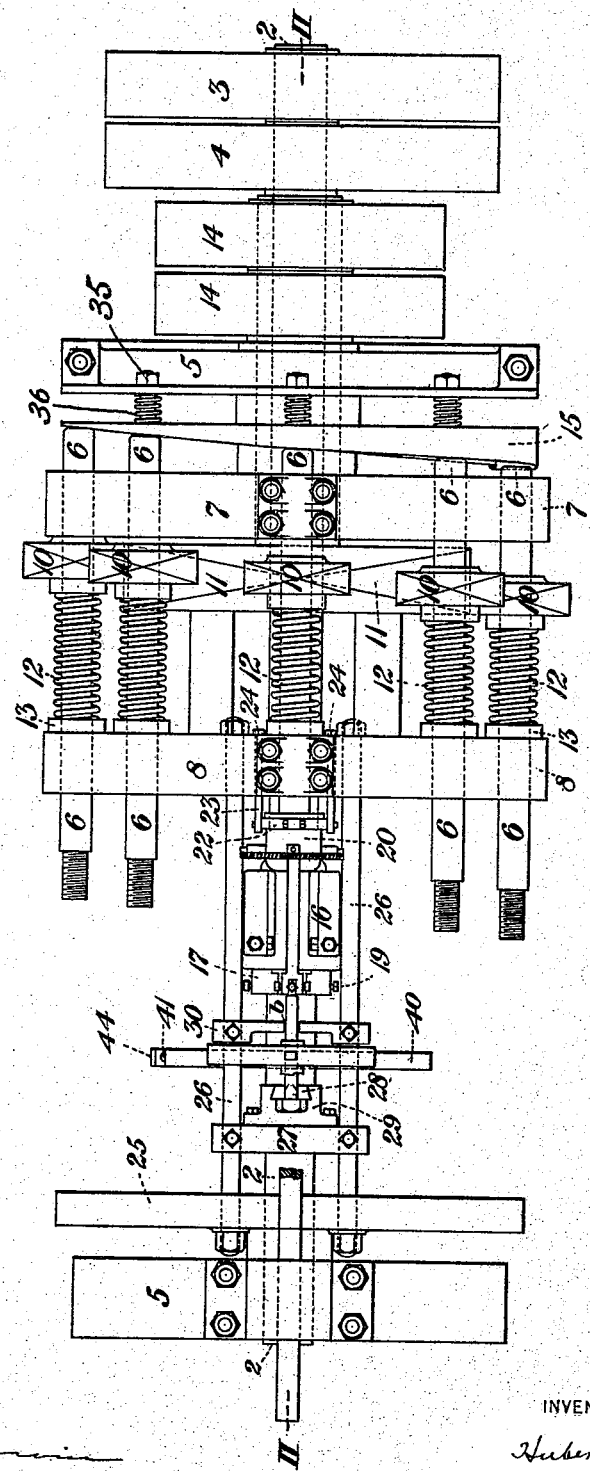

(No Model.) 3 Sheets—Sheet 1.

H. CREHAN.
BOLT THREADING MACHINE.

No. 490,901. Patented Jan. 31, 1893.

WITNESSES. INVENTOR.

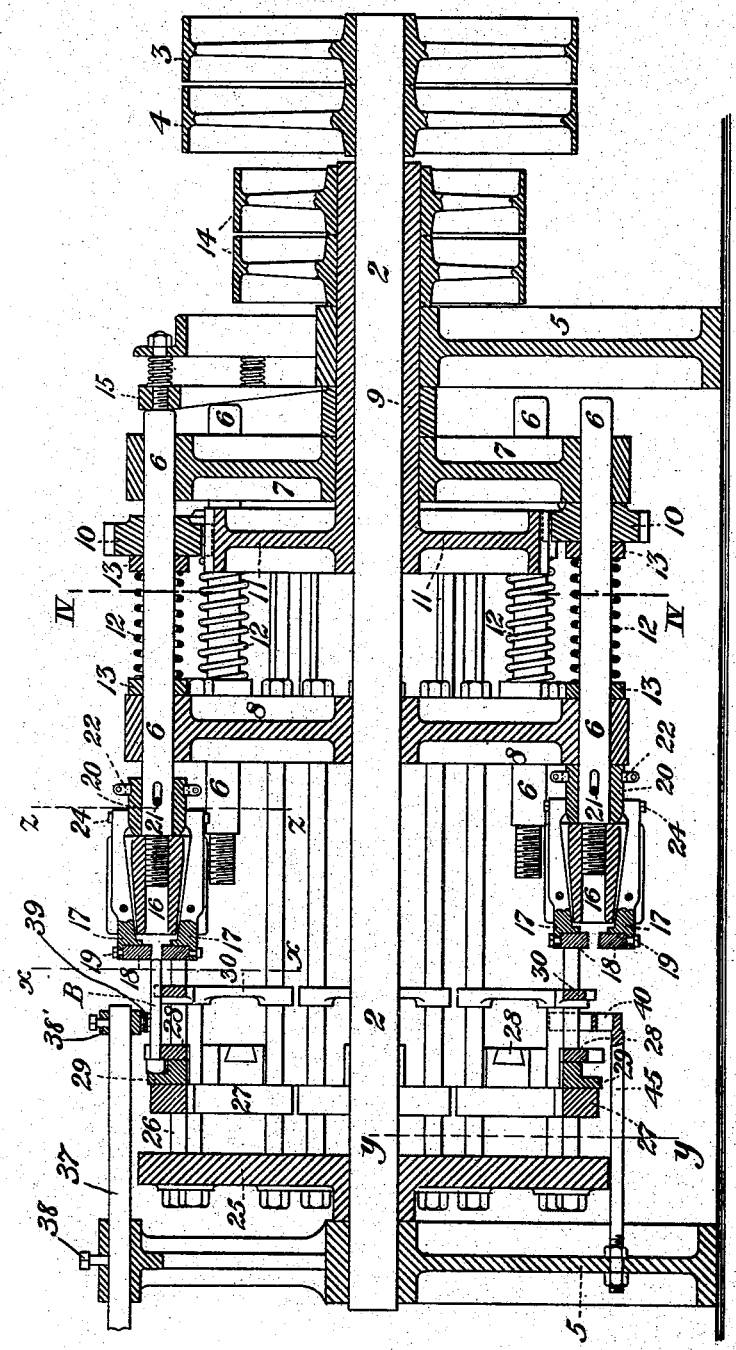

(No Model.) 3 Sheets—Sheet 3.
H. CREHAN.
BOLT THREADING MACHINE.
No. 490,901. Patented Jan. 31, 1893.
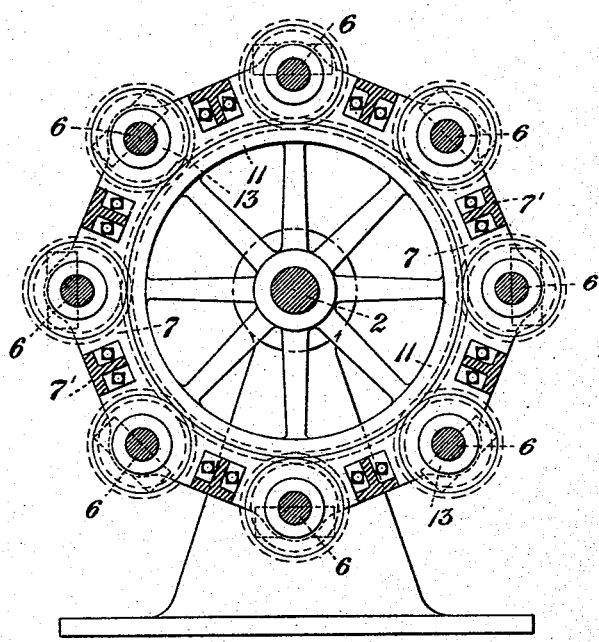
Fig. 4.
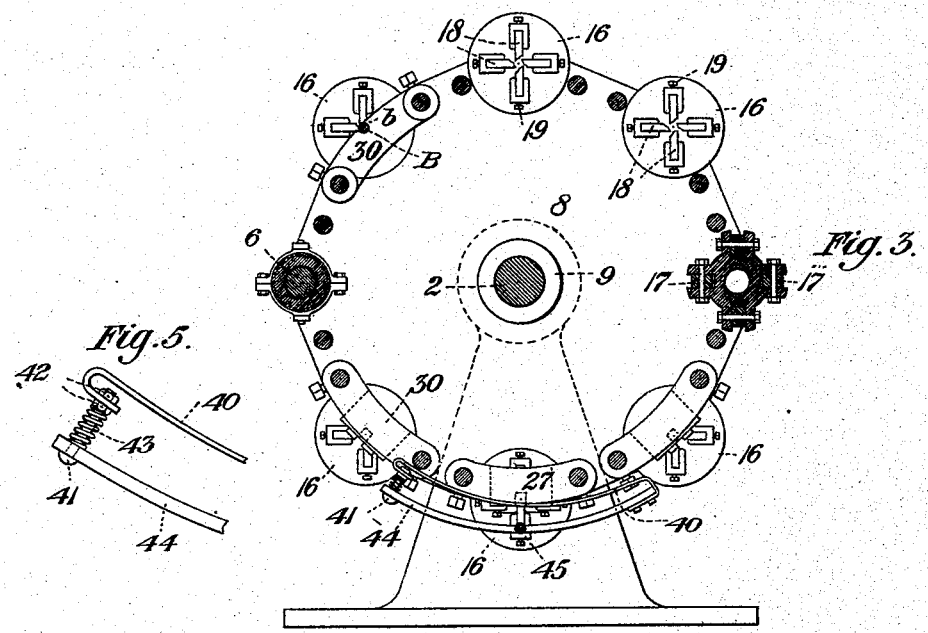
Fig. 5.
Fig. 3.
WITNESSES
INVENTOR.
Hubert Crehan
by
W. Bakewell & Sons
his attorneys

UNITED STATES PATENT OFFICE.

HUBERT CREHAN, OF PITTSBURG, PENNSYLVANIA, ASSIGNOR TO THE OLIVER IRON AND STEEL COMPANY, OF SAME PLACE.

BOLT-THREADING MACHINE.

SPECIFICATION forming part of Letters Patent No. 490,901, dated January 31, 1893.

Application filed December 9, 1891. Serial No. 414,461. (No model.)

*To all whom it may concern:*

Be it known that I, HUBERT CREHAN, of Pittsburg, in the county of Allegheny and State of Pennsylvania, have invented a new and useful Improvement in Bolt-Threading Machines, of which the following is a full, clear, and exact description, reference being had to the accompanying drawings, forming part of this specification, in which—

Figure 1 is a plan view of my improved machine. In this figure, only one of the heads for carrying the cutting-dies is shown, the others being omitted from their shafts, in order that the drawing may not be confused by multiplicity of detail. Fig. 2 is a vertical longitudinal section on the line II—II of Fig. 1. Fig. 3 is a vertical irregular section on the lines x—x, y—y, and z—z of Fig. 2. Fig. 4 is a vertical cross-section on the line IV—IV of Fig. 2. Fig. 5 is a detail view of the spring-support.

Like symbols of reference indicate like parts in each of the figures.

In the drawings, 2 represents the main shaft of the machine, and 3 and 4 are fast and loose pulleys for driving the shaft 2. The shaft 2 is journaled in suitable bearings in the upright frame 5 of the machine.

6, 6, are the spindles which carry the cutter-heads. There is any suitable number of these spindles. I have shown eight of them in the drawings. They are journaled in bearings in projecting heads or wheels 7, 8, of which the wheel 7 is journaled on the bush 9, which encircles the shaft 2, while the wheel 8 is keyed to the main shaft 2. The wheels 7 and 8 are preferably connected by tie-rods or braces 7', which unite the wheels and cause them to revolve in unison. Each of the spindles 6 is provided with a gear-wheel 10, which is keyed thereto, and the gear-wheels of the several spindles are in gear with the teeth of a pinion 11, which is loosely journaled on the shaft 2, and is preferably made integral with the bush 9, which is also loosely journaled on said shaft so as to be capable of rotation independently thereof.

12, 12, are springs interposed between the sides of the gear-wheels 10 and the opposing face of the wheel 8. These springs encircle the several spindles 6, and are preferably provided with collars 13, interposed between the ends of the springs and the surfaces against which they exert their force. The bush 9 and the wheel 11 are adapted to be rotated independently of the shaft 2, by means of fast and loose belt-pulleys 14. The spindles 6 are from their construction adapted to be moved longitudinally in their bearings, and for the purpose of imparting such motion thereto, a cam-ring or plate 15 is fixed to one of the uprights 5 of the machine-frame and is designed to bear against the ends of the spindles in the revolution around the axis of the shaft 2. As the ends of the spindles approach the prominent portion of the cam-ring, and when they reach the abrupt end thereof, they are in position to be retracted suddenly by means of the back pressure of the springs 12. At the end of each spindle 6 is secured a head 16, which carries the jaws 17 of the cutters. These jaws are severally pivoted between projecting wings of the head 16, as shown in the sectional views Figs. 2 and 3, and each is provided with an arm extending to the rear of the head, and with a second arm, preferably shorter, projecting to the front thereof, and constituting a socket for holding the cutting-die 18, which is secured in said socket by means of set-screws 19. There may be any suitable number of the cutting-dies arranged in each head. In the drawings I show each head provided with four cutting dies or jaws.

The jaws 17 are adapted to be opened and closed by the following means: On each of the spindles 6, is a collar 20, mounted thereon so as to be capable of independent longitudinal motion, but keyed to the shaft by a pin 21 passing through a slot in the spindle, so that the collar shall revolve with the spindle in the rotation of the latter. The end of each collar 20 next to the head 16, is made conical or tapering in form, and at the rear end, each collar is connected with the wheel 8 by loose sleeves 22 provided with rods 23, shown in Fig. 1, which extend through holes in the wheel 8 and are provided at their inner ends with nuts or heads 24, so that by the restraining motion of these rods, the collar is permitted only a limited forward motion with the spindle. The lower one of the two spindles, shown in Fig. 2, in its most retracted position, and the jaws 17 on the cutter-head are closed by reason of the contact of the collar 20 with the inner sides of the rear ends of the jaws. As the main-shaft 2 revolves and carries the spindles 6 around its axis, the ends of the spindles in succession come in contact with the cam-ring 15, and as they travel along this cam-ring, the spindles are moved forward lengthwise in their bearings by the action thereof, the effect of this being to feed forward the cutting-heads upon the bolts, the several spindles meanwhile being rotated on their own axes by the rotation of the pinion 11. The upper one of the two spindles, shown in Fig. 2, is illustrated as having moved forward nearly one-half of the stroke imparted by the action of the cam-ring 15. During such motion, the collar 20 on the spindle is moved with the latter, being carried therewith by reason of the friction exerted on the collar by the ends of the jaws 17. As the cam-ring continues to force forward the spindle, the collar 20 is restrained from further motion therewith by the rods 23, so that thenceforth the heads 16 and the jaws 17 move independently of and away from the collar. At the end of the forward motion of the spindle, the rear ends of the jaws 17, having reached the conical or tapering portion of the collar 20, are forced inwardly by a suitable annular spring or springs 46. This causes the outer ends of the jaws to diverge and to release the cutting-bits from the bolt, which being at this time preferably at the side of the machine drops out of its holder and from the dies. The spindle 6 at this time reaches the end of the cam-ring 15, and its end being released therefrom, the spindle is forced back by the spring 12, into the position shown at the lower part of Fig. 2, the jaws 17 being again closed by the mounting of the rear ends thereof upon the circumference of the collar 20. The cam-ring 15 is preferably about two-thirds of a circle in extent, and each of the cutter-heads is subjected to the several actions above described, once for each revolution of the main shaft 2. The spindles 6 are revolved on their own axes much more rapidly than the main shaft, the relative speed of revolution being dependent upon the number of threads to the inch to be cut on the bolt, as will be readily understood by those skilled in the art. The revolution of the main shaft effects the feeding of the dies to the bolts and the release of the bolts from the dies. The independent revolution of the spindles by turning the cutter-heads effects the actual cutting of the screw-threads on the bolts.

Instead of securing the cam-ring 15 rigidly to the frame 5, I prefer to arrange it as shown in Fig. 2, the ring being provided with bolts 35, which extend back through holes in the frame 5 and with interposed springs 36. The effect of this construction is that if the adjustment of the machine be not exact, and if the action of the cam-face would force the spindle 6 too rapidly forward for the proper action of the cutting-dies, the springs 36 will yield somewhat and thus prevent the cutting-dies from stripping the thread from the bolt.

I shall now describe the means which I employ for holding the bolts during the cutting operation.

25 is a head or wheel keyed to the main shaft 2 and connected with the wheel 8 by tie-rods 26, which tie-rods serve as supports for the carriages or bolt-holders. These holders 27 consist of metal bars or plates set on the rods 26, as shown in Figs. 1, 2, and 3, and on the inner side of each holder is bolted a block 29, having a plate 28, which is vertically slotted, the size and shape of the slot being such as to receive and neatly hold the square portion of the bolt next to the head. In advance of each holder, is a transverse guide 30, having in the middle portion a notch or slot $b$ on which the shank of the bolt rests, and by which the bolt is centered and held in proper position with relation to the cutting-dies.

37 is a rod which projects from the frame of the machine, to which it is preferably secured by a set-bolt 38, so as to permit it to be longitudinally adjustable.

38' is an arm, which is mounted on the rod 37 which carries a spring 39 situate directly opposite to the position in which the bolts are when they are engaged by the cutters. The arm 38' is preferably adjustable with the rod 37, and for this purpose is secured thereto by a set-bolt.

The machine as described does not form the essential feature of this application, as the same is described and claimed in my former patent No. 431,560, dated July 8, 1890.

In the use of this machine it has been found that the bolts, when correctly threaded as they pass to the under side of the supporting-ring, frequently stick in the jaws as the spindles leave the cam-ring, by reason of the heads dropping partly out of the slots in the plate 28, and consequently the bolts are pulled out of place and remain in the jaws when retracted. To prevent this difficulty, I provide beneath the machine, the curved spring 40, which at one end is bent back upon itself and is secured upon the bolt 41 by the two nuts 42, a coiled-spring 43 being provided between the lower nut and the bar 44 to which the bolt is secured. This bar 44 is curved in like manner to the spring 40, and at its middle portion is provided with the stem 45, by means of which the bar is adjustably fastened to the support 5. The spring extends parallel to the bar, and at its other end, is bent around the end of the bar 44, and bolted or riveted thereto. By means of this supporting spring the heads of the bolts, as they pass to the under side of the machine, are prevented from falling from the slots of the plate 28 until the cutters are opened and drawn back, thus leaving the bolt free to drop clear as soon as it reaches the end of the support.

The advantages of this support are obvious.

It is simple, easily placed upon the old machines, and prevents all sticking of the bolts in the jaws and consequent irregular working of the machine.

The endwise adjustment of the stem provides for bolts of different lengths, and as the bolts travel in the same plane, there is no sidewise pull or strain upon the holder as in former constructions, such as that of the patent to Coy No. 251,191 dated December 20, 1881.

It is evident that many changes may be made in the form and arrangement of this support without departure from my invention.

I claim:—

1. In a machine for cutting screw threads the combination of a rotary frame having bolt holders, cutters rotary with the frame and movable to engage the bolts and thread the same, and a spring which is adjustable along the bolts and bears against the same upon the under side of the machine, substantially as described.

2. In a machine for cutting screw-threads, the combination of a rotary frame having bolt-holders, cutters rotary with the frame and movable to engage the bolts, a curved bar supported beneath the machine, at right angles to the bolt-holders, and a curved leaf spring adjustably secured thereto and arranged to bear upon the bolts; substantially as and for the purposes described.

3. In a machine for cutting screw-threads, the combination of a rotary frame having bolt holders cutters rotary with the frame, and movable to engage the bolts, a curved bar supported beneath the machine, a curved leaf spring extending along the bar, a pin limiting the upward throw of the leaf spring and a second spring holding the leaf spring up to its normal position, substantially as described.

In testimony whereof I have hereunto set my hand this 5th day of December, A. D. 1891.

HUBERT CREHAN.

Witnesses:
W. B. CORWIN,
H. M. CORWIN.